United States Patent
Nitta et al.

(10) Patent No.: US 9,159,501 B2
(45) Date of Patent: Oct. 13, 2015

(54) ELECTRIC STORAGE DEVICE

(71) Applicant: GS Yuasa International Ltd., Kyoto-shi (JP)

(72) Inventors: Kazushi Nitta, Kyoto (JP); Takaaki Iguchi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 87 days.

(21) Appl. No.: 14/023,341

(22) Filed: Sep. 10, 2013

(65) Prior Publication Data
US 2014/0072849 A1    Mar. 13, 2014

(30) Foreign Application Priority Data
Sep. 13, 2012 (JP) .................................. 2012-201335

(51) Int. Cl.
| | |
|---|---|
| H01M 2/02 | (2006.01) |
| H01M 2/26 | (2006.01) |
| H01G 4/32 | (2006.01) |
| H01G 9/15 | (2006.01) |
| H01G 11/24 | (2013.01) |
| H01G 11/66 | (2013.01) |
| H01M 10/04 | (2006.01) |
| H01G 11/84 | (2013.01) |
| H01G 13/02 | (2006.01) |

(52) U.S. Cl.
CPC .................. *H01G 11/24* (2013.01); *H01G 4/32* (2013.01); *H01G 9/151* (2013.01); *H01G 11/66* (2013.01); *H01G 11/84* (2013.01); *H01G 13/02* (2013.01); *H01M 2/0217* (2013.01); *H01M 2/263* (2013.01); *H01M 10/0431* (2013.01); *Y02E 60/13* (2013.01)

(58) Field of Classification Search
USPC .......................................................... 429/94
See application file for complete search history.

(56) References Cited

U.S. PATENT DOCUMENTS

| | | | |
|---|---|---|---|
| 8,431,265 B2 | 4/2013 | Kimijima et al. | |
| 2004/0045597 A1 | 3/2004 | Kimijima et al. | |
| 2005/0277018 A1* | 12/2005 | Kim .............................. | 429/120 |

(Continued)

FOREIGN PATENT DOCUMENTS

| | | |
|---|---|---|
| JP | 08-339817 A | 12/1996 |
| JP | 2000-021452 A | 1/2000 |

(Continued)

OTHER PUBLICATIONS

European Search Report dated Dec. 20, 2013.

*Primary Examiner* — Gregg Cantelmo
(74) *Attorney, Agent, or Firm* — McGinn IP Law Group, PLLC.

(57) ABSTRACT

An electric storage device includes an electrode assembly, in which a positive electrode and a negative electrode in the shape of a sheet are wound with a separator sandwiched therebetween. The electrode assembly has a flat shape and includes a first flat portion and a second flat portion, which are opposed to each other, and a first curved portion and a second curved portion which connect end portions of the first and second flat portions together. One of the positive electrode and the negative electrode covers an inner-circumferential end portion of the other electrode and is disposed on an innermost circumference of the electrode assembly. An inner-circumferential end portion of the one of the electrodes causes an elastic force to act outwardly on the other electrode.

17 Claims, 11 Drawing Sheets

(56) References Cited

U.S. PATENT DOCUMENTS

| | | | |
|---|---|---|---|
| 2007/0117009 A1* | 5/2007 | Yamauchi et al. | 429/160 |
| 2007/0154794 A1* | 7/2007 | Kim et al. | 429/162 |
| 2008/0241687 A1 | 10/2008 | Ishi et al. | |
| 2009/0202900 A1 | 8/2009 | Kuroda et al. | |
| 2009/0297929 A1* | 12/2009 | Uchida | 429/94 |
| 2011/0091755 A1 | 4/2011 | Kuroda et al. | |
| 2011/0104539 A1* | 5/2011 | Oh et al. | 429/94 |
| 2011/0111275 A1 | 5/2011 | Kawase | |
| 2011/0195286 A1* | 8/2011 | Aota et al. | 429/94 |
| 2012/0058373 A1* | 3/2012 | Morikawa et al. | 429/94 |
| 2012/0196165 A1* | 8/2012 | Kim | 429/94 |

FOREIGN PATENT DOCUMENTS

| | | |
|---|---|---|
| JP | 2001-313062 A | 11/2001 |
| JP | 2003-151512 A | 5/2003 |
| JP | 2005-174833 A | 6/2005 |
| JP | 2006-278266 A | 10/2006 |
| JP | 2007-73317 A | 3/2007 |
| JP | 2008-78008 A | 4/2008 |
| JP | 2008-251256 A | 10/2008 |
| JP | 2010-287513 A | 12/2010 |
| JP | 2011-081973 A | 4/2011 |

* cited by examiner

F I G . 5A
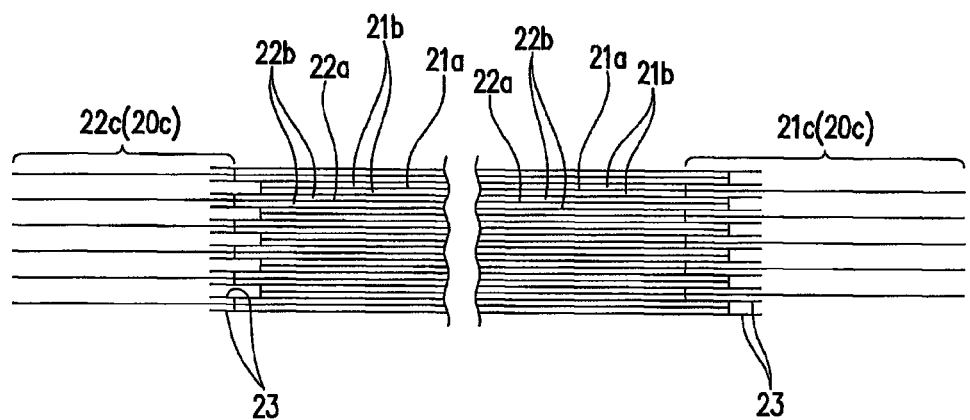
F I G . 5B
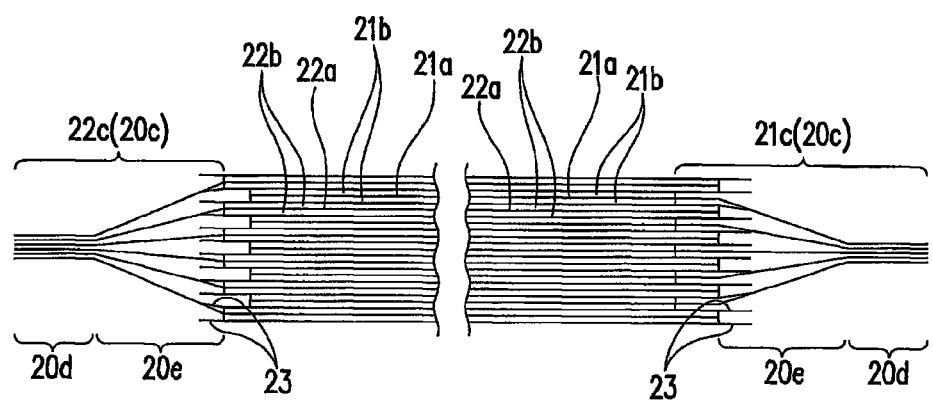
F I G . 5C
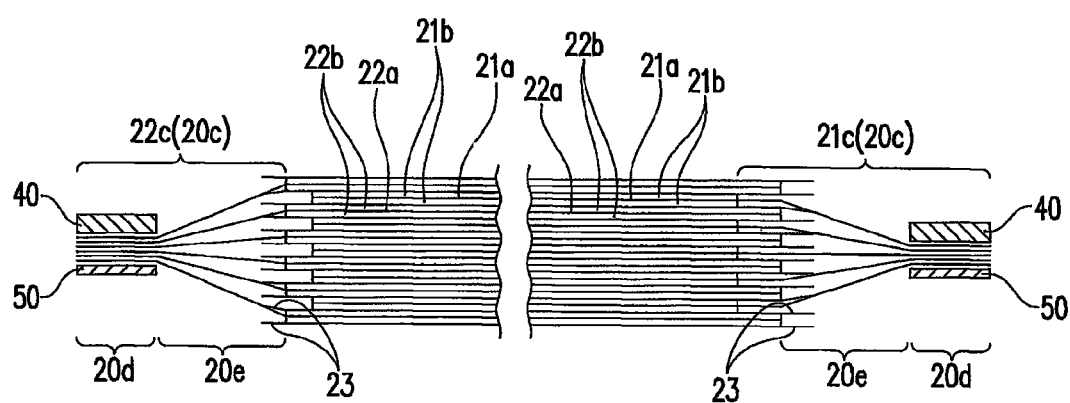

Related Art

F I G . 10
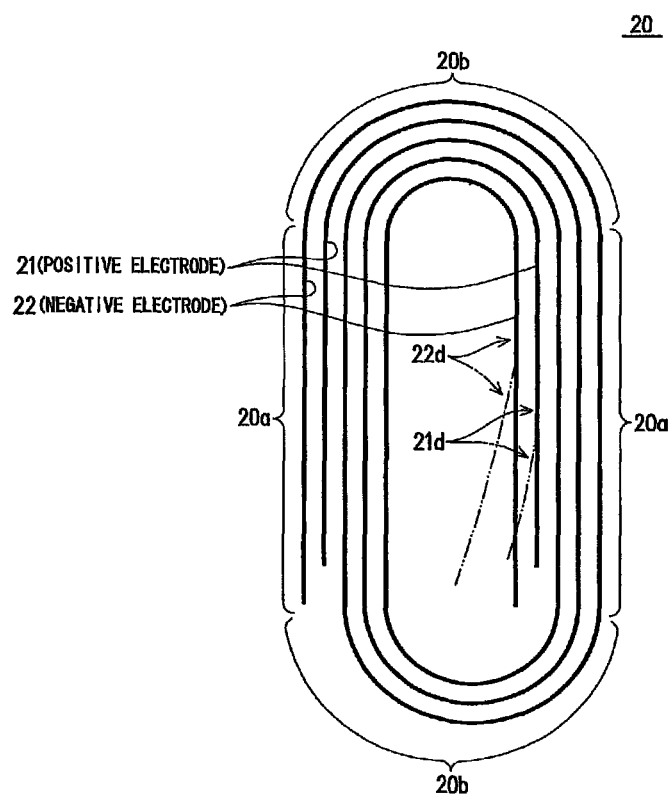
Related Art

F I G. 11
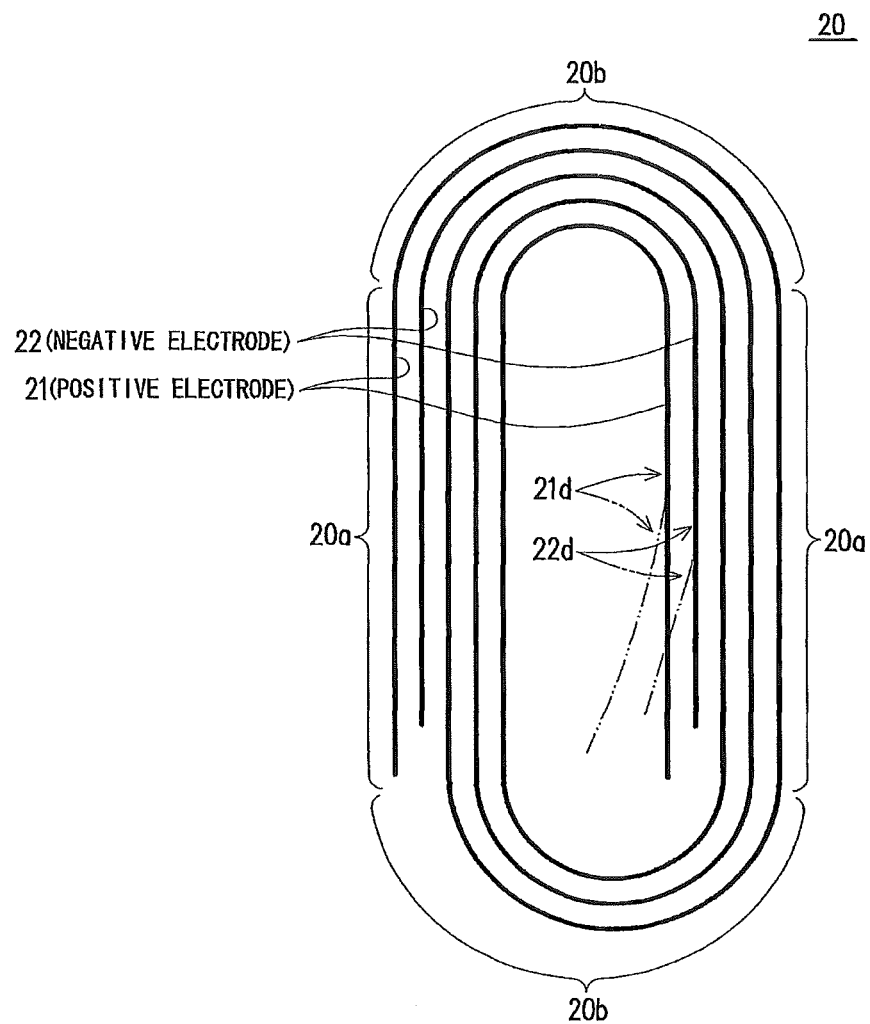
Related Art

ELECTRIC STORAGE DEVICE

CROSS-REFERENCE TO RELATED APPLICATIONS

This application claims the benefit of Japanese Patent Application No. 2012-201335, which is incorporated herein by reference.

FIELD

The present invention relates to an electric storage device.

BACKGROUND

Rechargeable electric storage devices have recently been adopted as the power sources of vehicles (e.g., an automobile and a motorcycle) and various devices (e.g., a portable terminal and a laptop personal computer). Examples of the electric storage devices include battery cells (e.g., a lithium-ion battery cell and a nickel-metal-hydride battery cell), and capacitors (e.g., an electric double layer capacitor). Various types of cells are provided. As one of such cells, there is available a cell which is provided with an electrode assembly in which a positive electrode and a negative electrode in the shape of a sheet are wound with a separator sandwiched therebetween and a current collector connected to this electrode assembly.

As shown in FIG. 9C, a positive electrode 21, a negative electrode 22 and a separator 23 are stacked in the order of the separator 23, the negative electrode 22, the separator 23 and the positive electrode 21. These are wound in cylindrical shape to have the positive electrode 21 located outside. After that, the side surfaces of the cylindrical shape are pressed from both sides, whereby the side surfaces are crushed into a flat shape and deformed. Thus, the electrode assembly is fabricated. Alternatively, the electrode assembly is fabricated such that a laminate of the separator 23, the negative electrode 22, the separator 23, and the positive electrode 21, which are stacked in this order from the inner side, is wound into a flat shape.

As shown in FIG. 9A, the positive electrode 21 is provided with a positive-electrode active material layer (a positive-electrode active material coated portion) 21b on each of both surfaces of a positive-electrode current collector substrate 21a. This positive-electrode active material layer is formed, for example, by applying a positive-electrode active material paste to one surface of the positive-electrode current collector substrate 21a, drying the paste, then similarly applying a positive-electrode active material paste to the other surface of the positive-electrode current collector substrate 21a and drying the paste. The positive-electrode current collector substrate 21a is formed from, for example, long strip-shaped aluminum foil.

As shown in FIG. 9B, the negative electrode 22 is provided with a negative-electrode active material layer (a negative-electrode active material coated portion) 22b on each of both surfaces of a negative-electrode current collector substrate 22a. This negative-electrode active material layer is formed, for example, by applying a negative-electrode active material paste to one surface of the negative-electrode current collector substrate 22a, drying the paste, then similarly applying a negative-electrode active material paste to the other surface of the negative-electrode current collector substrate 22a and drying the paste. The negative-electrode current collector substrate 22a is formed from, for example, long strip-shaped copper foil.

More specifically, with the exception of one end portion of the positive-electrode current collector substrate 21a in the width direction, the positive electrode 21 is, for example, coated with a positive-electrode active material paste on both surfaces. Whereby, the positive electrode 21 is provided with the positive-electrode active material layer 21b on each of both surfaces of the positive-electrode current collector substrate 21a except this end portion. For this reason, in this end portion, the positive-electrode current collector substrate 21a (a positive-electrode active material layer-non-formed portion 21c) is exposed. On the other hand, with the exception of one end portion of the negative-electrode current collector substrate 22a in the width direction, the negative electrode 22 is, for example, coated with a negative-electrode active material paste on both surfaces. Whereby, the negative electrode 22 is provided with the negative-electrode active material layer 22b on each of both surfaces of the negative-electrode current collector substrate 22a except this end portion. For this reason, in this end portion, the negative-electrode current collector substrate 22a (a negative-electrode active material layer-non-formed portion 22c) is exposed.

As shown in FIG. 9C, the separator 23 physically isolates the positive electrode 21 and the negative electrode 22 from each other and holds an electrolyte.

In order to prevent the precipitation of dendrite and the like, the negative-electrode active material layer 22b is applied with a larger width than the positive-electrode active material layer 21b. The separator 23, which provides insulation between the positive electrode 21 and the negative electrode 22, has a larger width than the positive-electrode active material layer 21b and the negative-electrode active material layer 22b. However, the separator 23 has a width not covering the positive-electrode active material layer-non-formed portion 21c or the negative-electrode active material layer-non-formed portion 22c, which protrude widthwise.

As shown in the conceptual diagram of FIG. 10, an electrode assembly 20 (a wound electrode assembly 80) of a cell described in Patent Literature 1 (Japanese Patent Application Laid-Open No. 2010-287513) is such that an inner-circumferential end portion 22d (indicated by a solid line) of the negative electrode 22 covers an inner-circumferential end portion 21d (indicated by a solid line) of the positive electrode 21 and is wound so that the negative electrode 22 is disposed on an innermost circumference of the electrode assembly 20. As shown in the conceptual diagram of FIG. 11, an electrode assembly 20 (an electrode assembly group 2) of a cell described in Patent Literature 2 (Japanese Patent Application Laid-Open No. 2008-251256) is such that an inner-circumferential end portion 21d (indicated by a solid line) of the positive electrode 21 covers an inner-circumferential end portion 22d (indicated by a solid line) of the negative electrode 22 and is wound so that the positive electrode 21 is disposed on an innermost circumference of the electrode assembly 20. In FIGS. 10 and 11, the number of windings of the positive electrode 21 and the negative electrode 22 is smaller than it really is in order to make the configuration of winding clearly understandable. In an actual electrode assembly 20, winding is performed in a larger number and in a denser manner. In FIGS. 10 and 11, the illustration of the separator 23 is omitted.

Each of the electrode assemblies 20, 20 is of a flat shape. The electrode assembly 20 has first and second flat portions 20a, 20a, and first and second curved portions 20b, 20b. The first and second flat portions 20a, 20a are opposed to each other. The first and second curved portions 20b, 20b connect end portions of the first and second flat portions 20a, 20a together. The electrode assembly 20 described in Patent Literature 1 is wound in such a manner that a leading-end edge of the inner-circumferential end portion 22*d* of the negative electrode 22 is positioned in the flat portion 20*a*. The electrode assembly 20 described in Patent Literature 2 is wound in such a manner that a leading-end edge of the inner-circumferential end portion 21*d* of the positive electrode 21 is positioned in the flat portion 20*a*. That is, in each electrode assembly 20, the leading-end edge of the inner-circumferential end portion of the electrode disposed on the innermost circumference is positioned in the flat portion 20*a*.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In the electrode assembly 20 described in Patent Literature 1, the inner-circumferential end portion 22*d* of the negative electrode 22 is apt to move in the space at the winding center (indicated by a dashed-two dotted line). In association with this, also the inner-circumferential end portion 21*d* of the positive electrode 21 is apt to move (indicated by a dashed-two dotted line). In the electrode assembly 20 described in Patent Literature 2, the inner-circumferential end portion 21*d* of the positive electrode 21 is apt to move in the space at the winding center (indicated by a dashed-two dotted line). In association with this, also the inner-circumferential end portion 22*d* of the negative electrode 22 is apt to move (indicated by a dashed-two dotted line).

In the event where the inner-circumferential end portion 22*d* of the negative electrode 22 moves and the inner-circumferential end portion 21*d* of the positive electrode 21 moves, the interelectrode distance between the positive electrode 21 and the negative electrode 22 increases. In addition, the inner-circumferential end portion 22*d* of the negative electrode 22 may be bent, and the inner-circumferential end portion 21*d* of the positive electrode 21 may be bent. Thus, the function of the electrode in this area may be impaired. For this reason, a problem arises that the capacity of the cell decreases.

An object of the present invention is to provide an electric storage device capable of preventing an inner-circumferential end portion of a negative electrode and an inner-circumferential end portion of a positive electrode from moving in the space at the winding center of an electrode assembly.

An electric storage device according to an aspect of the present invention includes an electrode assembly, in which a positive electrode and a negative electrode in the shape of a sheet are wound with a separator sandwiched therebetween, wherein the electrode assembly has a flat shape and includes a first flat portion and a second flat portion, which are opposed to each other, and a first curved portion and a second curved portion which connect end portions of the first and second flat portions together, one of the positive electrode and the negative electrode covers an inner-circumferential end portion of the other electrode and is disposed on an innermost circumference of the electrode assembly, and an inner-circumferential end portion of the one of the electrodes causes an elastic force to act outwardly on the other electrode.

BRIEF DESCRIPTION OF DRAWINGS

The foregoing and other features of the present invention will become apparent from the following description and drawings of an illustrative embodiment of the invention in which:

FIG. 5A is a transverse cross-sectional conceptual diagram of electrode assemblies;

FIG. 5B is a transverse cross-sectional conceptual diagram of the electrode assembly in a state in which end portions thereof are bundled;

FIG. 5C is a transverse cross-sectional conceptual diagram of the electrode assembly in a state in which current collectors are joined to end portions of the electrode assembly;

FIG. 10 is a longitudinal sectional conceptual diagram of a conventional electrode assembly; and FIG. 11 is a longitudinal sectional conceptual diagram of another conventional electrode assembly.

DESCRIPTION OF EMBODIMENTS

Figure 1:
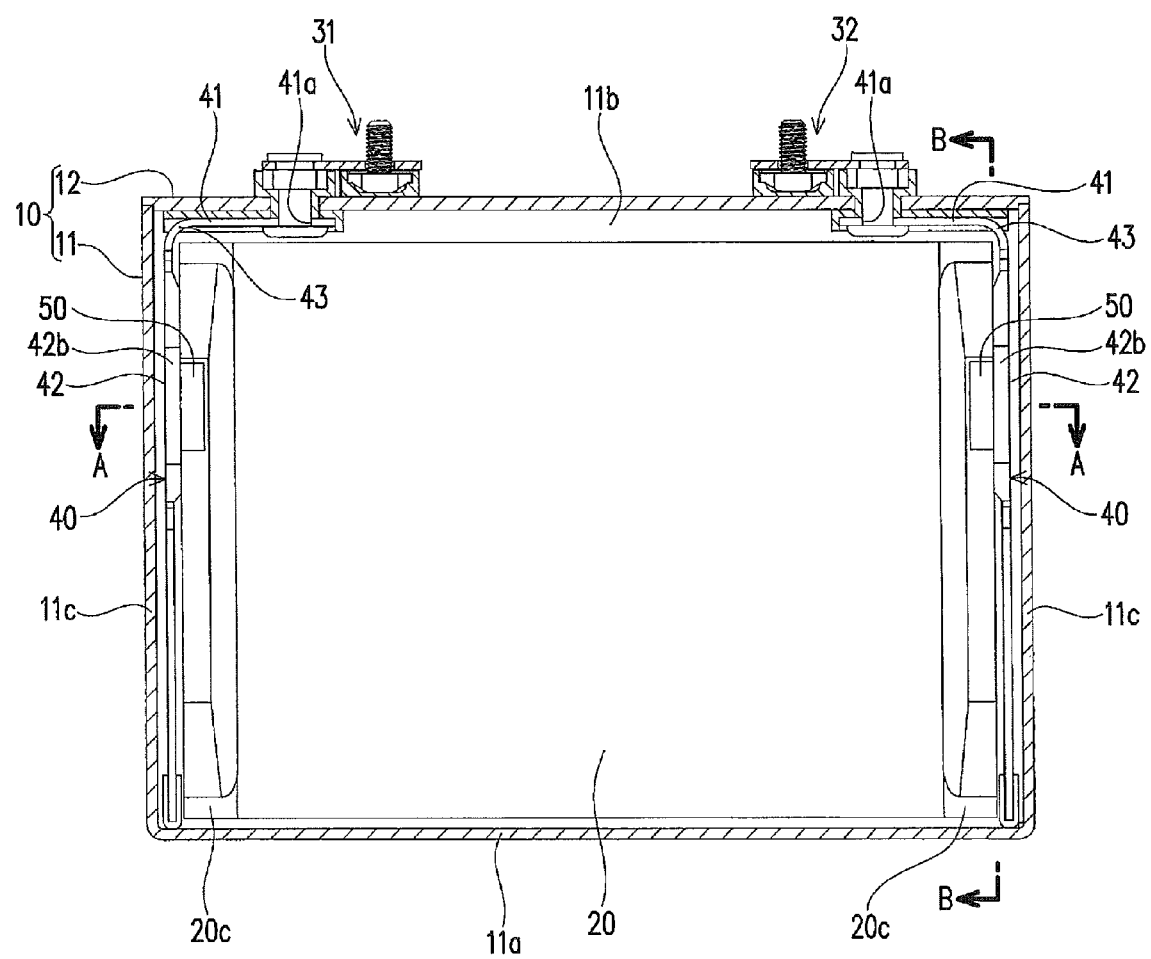
FIG. 1 is a partially broken front view of a cell, which is an embodiment of an electric storage device of the present invention.

An electric storage device includes an electrode assembly, in which a positive electrode and a negative electrode in the shape of a sheet are wound with a separator sandwiched therebetween. The electrode assembly includes a first flat portion and a second flat portion, which are opposed to each other, and a first curved portion and a second curved portion which connect end portions of the first and second flat portions together. The electrode assembly has a flat shape. One of the positive electrode and the negative electrode covers an inner-circumferential end portion of the other electrode and is disposed on an innermost circumference of the electrode assembly. An inner-circumferential end portion of the one of the electrodes causes an elastic force to act outwardly on the other electrode.

As an aspect of the electric storage device of the present invention, a leading-end edge of the inner-circumferential end portion of the one of the electrodes may be positioned in an area of one of the first and second curved portions beyond a fold-back point of the one of the first and second curved portions.

According to this configuration, the leading end portion of the inner-circumferential end portion of one of the electrodes is curved along an inner surface of the one of the first and second curved portions. For this reason, the leading end portion of the inner-circumferential end portion of one of the electrodes generates an elastic force with which this leading end portion tends to go back straight and spread outwardly, whereby this leading end portion is kept in a state in which the leading end portion extends along the inner surface of the electrode assembly. Therefore, the inner-circumferential end portion of one of the electrodes does not move in the space at the winding center.

As another aspect of the electric storage device of the present invention, each of the first and second curved portions may have the shape of a circular arc with a radius of curvature of not less than 0.1 mm.

As a further aspect of the electric storage device of the present invention, a leading-end edge of the inner-circumferential end portion of the other electrode may be positioned in the one of the first and second flat portions.

As an even further aspect of the electric storage device of the present invention, the one of the electrodes may have a protruding portion, a restraining portion, and a current collector connected to the restraining portion. The protruding portion protrudes from a side end of the other electrode in a direction along the winding center of the electrode assembly. The restraining portion is formed by bundling areas of the protruding portion spaced from the inner-circumferential end portion of the one of the electrodes.

In this case, the restraining portion may include a first restraining portion on one side of the protruding portion and a second restraining portion on the other side of the protruding portion with the winding center of the electrode assembly therebetween. The first restraining portion restrains the one side of the protruding portion. The second restraining portion restrains the other side of the protruding portion.

The restraining portion may be formed at a position of the first and second flat portions, the position being shifted to (located close to) the other curved portion on the side opposite to the one of the first and second curved portions in which the leading-end edge of the inner-circumferential end portion of the one of the electrodes is positioned.

Furthermore, as a further aspect of the electric storage device of the present invention, the one of the electrodes may be a negative electrode and the other electrode may be a positive electrode.

As described above, according to the present invention, it is possible to prevent an inner-circumferential end portion of a negative electrode and an inner-circumferential end portion of a positive electrode from moving in the space at the winding center of an electrode assembly.

A cell which is an embodiment of the electric storage device of the present invention will be described in detail below with reference to FIGS. 1 to 7.

Figure 2:
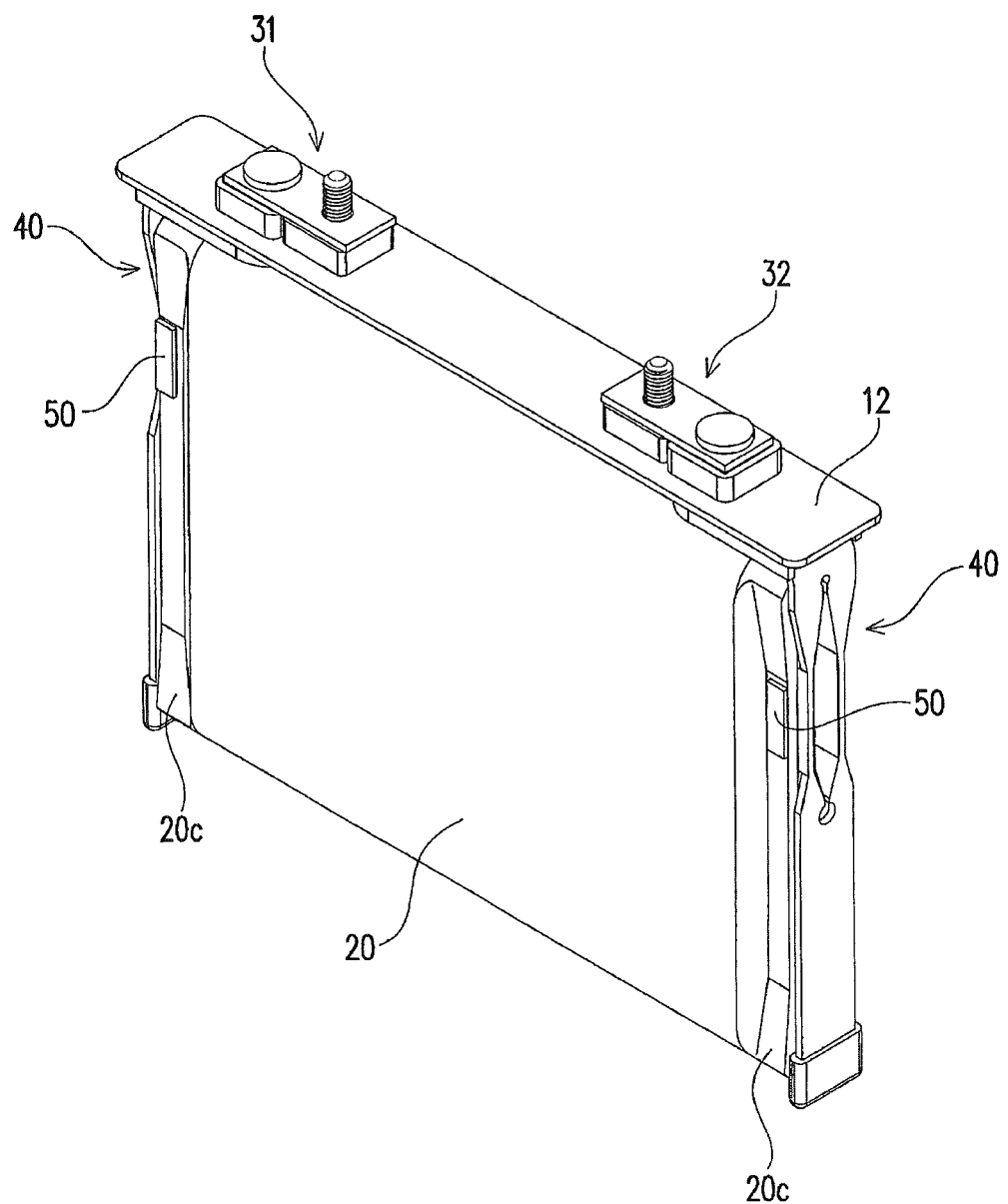
FIG. 2 is a perspective view of a structure in a case of the cell.

As shown in FIGS. 1 and 2, the cell is provided with a case 10 made of metal, an electrode assembly 20, a positive electrode terminal 31 and a negative electrode terminal 32, a current collector 40, a backing member 50, and the like. The electrode assembly 20 is accommodated in the interior of the case 10. The positive electrode terminal 31 and the negative electrode terminal 32 protrude from the interior of the case 10 to outside. The current collector 40 connects each end portion of the electrode assembly 20 to each of the electrode terminals 31, 32. The backing member 50 is connected to an end portion of the electrode assembly 20 in conjunction with the current collector 40.

The case 10 is formed by a combination of a case body 11 in the shape of a bottomed square cylinder having an opening and a cover plate 12 with which the opening of the case body 11 is sealed. After the installation of both members 11, 12, an end edge of the opening of the case body 11 and an outer circumferential edge of the cover plate 12 are welded. Whereby, both members 11, 12 are integrated with each other.

The case body 11 has a pair of opposed side plate portions 11b and a pair of opposed end plate portions 11c standing upright on peripheral edges of a rectangular bottom portion 11a. The pair of end plate portions 11c of the case body 11 are formed so as to be smaller in width (than the pair of side plate portions 11b). In this way, the case body 11 is formed into the shape of a thin rectangular cylinder having a small depth and closed at its bottom.

Holes (not numbered) through which the electrode terminals 31 and 32 are passed are formed in the cover plate 12. The electrode terminals 31 and 32 are passed through the holes of the cover plate 12 and fixed on the cover plate 12 like rivets. As a result, outer end portions of the electrode terminals 31 and 32 project from the cover plate 12, and inner end portions of the electrode terminals 31 and 32 project into the interior of the case 10.

The electrode assembly 20 has a flat shaped wound structure including the positive electrode 21, the negative electrode 22, and the separator 23. In this sense, the electrode assembly 20 is the same as conventional electrode assemblies. Therefore, the description of the electrode assembly 20 and the description of the positive electrode 21, the negative electrode 22, and the separator 23 in the Background section of this specification is incorporated herein by reference as a description of the electrode assembly 20 of this embodiment.

Figure 3:
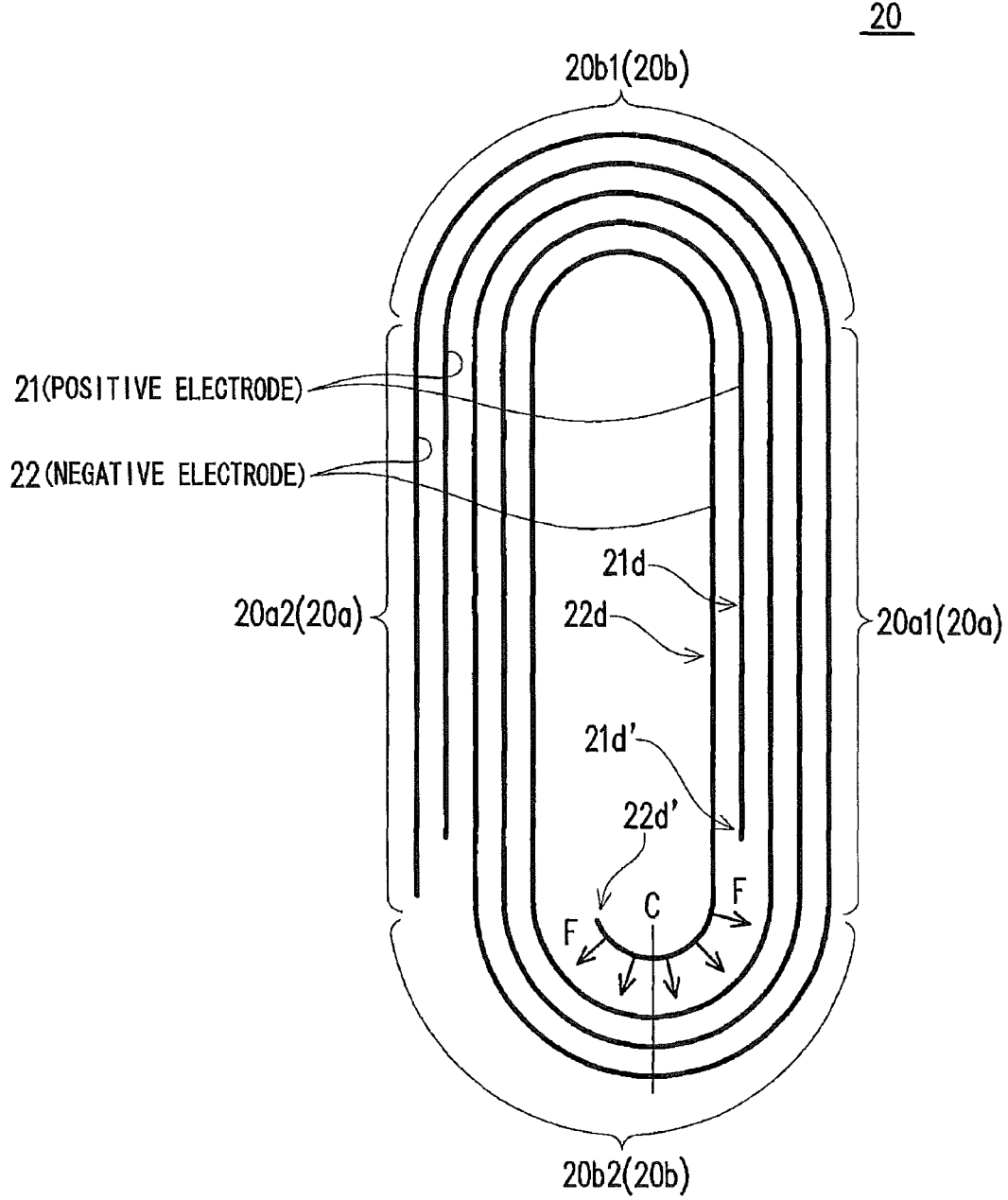
FIG. 3 is a longitudinal sectional conceptual diagram of an electrode assembly of the cell.

As is apparent from FIG. 3, the electrode assembly 20 of this embodiment differs from the electrode assembly described in Patent Literature 1 and the electrode assembly described in Patent Literature 2 in that the electrode assembly 20 of this embodiment is wound in such a manner that the inner-circumferential end portion 22d of the negative electrode 22 covers the inner-circumferential end portion 21d of the positive electrode 21 and the negative electrode 22 is disposed in the innermost circumference of the electrode assembly 20. In addition, the electrode assembly 20 differs from the electrode assembly in Patent Literature 1 or 2 in that the electrode assembly 20 of this embodiment is wound in such a manner that a leading-end edge 22d' of the inner-circumferential end portion 22d of the negative electrode 22 is positioned in an area of the curved portion 20b beyond the fold-back point C. In FIG. 3, the number of windings of the positive electrode 21 and the negative electrode 22 is smaller than it really is in order to make the configuration of winding clearly understandable. However, in an actual electrode assembly 20, winding is performed in a larger number and in a denser manner. In FIG. 3, the illustration of the separator 23 is omitted.

In this embodiment, the curved portion 20b is semicircular. That is, the curved portion 20b has an angle range of 180 degrees. Therefore, the fold-back point C is located at a point of 90 degrees, which is a half of this value. In the case where the flat portion 20a, which is arranged on the right side of the figure, is referred to as a first flat portion 20a1, the flat portion 20a, which is arranged on the left side of the figure, is referred to as a second flat portion 20a2, the curved portion 20b, which is arranged on the upper side of the figure (the opening side of the case body 11) is referred to as a first curved portion 20b1, and the curved portion 20b, which is arranged on the lower side of the figure (the bottom portion 11a of the case body 11) is referred to as a second curved portion 20b2, the leading-end edge 22d' of the inner-circumferential end portion 22d of the negative electrode 22 is positioned in an angle range from the fold-back point C of the second curved portion 20b2 to the terminal point of the second curved portion 20b2 (a connecting point between the second curved portion 20b2 and the second flat portion 20a2), i.e., in an angle range of 90 to 180 degrees (where the start point of the second curved portion 20b2 (a connecting point between the second curved portion 20b2 and the first flat portion 20a1) is set to 0 degrees).

A leading-end edge 21d' of the inner-circumferential end portion 21d of the positive electrode 21 is positioned in the first flat portion 20a1. More specifically, the leading-end edge 21d' of the inner-circumferential end portion 21d of the positive electrode 21 is positioned in an area which is closer to the terminal point of the first flat portion 20a1 (a connecting point between the first flat portion 20a1 and the second curved portion 20b2) in the first flat portion 20a1 than the middle point in the first flat portion 20al.

As a result of this, the leading end portion of the inner-circumferential end portion 22d of the negative electrode 22 is curved in the shape of a circular arc along the inner surface of the curved portion 20b. On the other hand, the leading end portion of the inner circumferential end portion 21d of the positive electrode 21 is not curved, but is straight along the inner surface of the flat portion 20a.

The first and second curved portions 20b1, 20b2 have both the shape of a circular arc with a radius of curvature of not less than 0.1 mm.

In winding the positive electrode 21, the negative electrode 22, and the separator 23, the positive electrode 21 and the negative electrode 22 are shifted laterally in the width direction. As shown in FIG. 5A, on one side of the electrode assembly 20, the positive-electrode active material layer-non-formed portion 21c protrudes from the side end of the negative electrode 22, whereas on the other side of the electrode assembly 20 the negative-electrode active material layer-non-formed portion 22c protrudes from the side end of the positive electrode 21. As a result of this, the electrode assembly 20 has a protruding portion 20c of the positive electrode on one-end side and a protruding portion 20c of the negative electrode on the other-end side.

As shown in FIG. 5B, the protruding portion 20c of the positive electrode has a restraining portion 20d and an inclined portion 20e. The protruding portion 20c of the negative electrode also has a restraining portion 20d and an inclined portion 20e. Each restraining portion 20d is formed by bundling leading end portions of this protruding portion 20c by mutual tight contact in the stage prior to joining to the current collector 40. Each inclined portion 20e inclines from the base end side of the protruding portion 20c toward the restraining portion 20d.

As shown in FIG. 5C, a current collector 40 for the positive electrode is disposed on one surface of the restraining portion 20d in the protruding portion 20c of the positive electrode, and a backing plate 50 is disposed on the other surface of the restraining portion 20d. The current collector 40 for the positive electrode and the backing plate 50 each are made of, for example, aluminum or an aluminum alloy. The current collector 40 for the positive electrode and the backing plate 50, along with the restraining portion 20d, are joined by ultrasonic joining, for example. A current collector 40 for the negative electrode is disposed on one surface of the restraining portion 20d in the protruding portion 20c of the negative electrode, and a backing plate 50 is disposed on the other surface of the restraining portion 20d. The current collector 40 and the backing plate 50 of the negative electrode each are made of, for example, copper or a copper alloy. The current collector 40 and the backing plate 50 for the negative electrode, along with the restraining portion 20d, are joined by ultrasonic joining, for example.

Referring to FIGS. 1 and 2 again, the electrode assembly 20 fabricated in the manner as described above is accommodated in the case 10 such that the winding axis is in parallel to the bottom portion 11a of the case 10. That is, each of the pair of protruding portions 20c, 20c of the electrode assembly 20 faces each end plate portion 11c of the case 10.

The current collector 40 includes the current collector 40 for the positive electrode and the current collector 40 for the negative electrode. The current collector 40 for the positive electrode connects the protruding portion 20c of the positive electrode of the electrode assembly 20 and the positive electrode terminal 31. The current collector 40 for the negative electrode connects the protruding portion 20c of the negative electrode of the electrode assembly 20 and the negative electrode terminal 32. The current collector 40 is provided with an inner connecting portion 41, an electrode attachment portion 42, and an intermediate portion 43. To the inner connecting portion 41, the positive electrode terminal 31 or the negative electrode terminal 32 is connected by being caulked like a rivet or by welding. The electrode attachment portion 42 is directly or indirectly connected to the restraining portion 20d in the protruding portion 20c of the positive electrode of the electrode assembly 20 or to the restraining portion 20d in the protruding portion 20c of the negative electrode. The intermediate portion 43 connects the inner connecting portion 41 and the electrode attachment portion 42 to each other. The current collector 40 is formed from one sheet of metal material. The current collector 40 has a deformed letter L shape as seen from the front.

The current collector 40 for the positive electrode is made of, for example, aluminum or an aluminum alloy, and the current collector 40 for the negative electrode is made of, for example, copper or a copper alloy.

In the current collector 40, the inner connecting portion 41 and the electrode attachment portion 42 extend perpendicularly with the intermediate portion 43 as a fold line (in the letter L as seen from the front). The inner connecting portion 41 is disposed along the inner surface of the cover plate 12 of the case 10 in a condition in which the inner connecting portion 41 is insulated from the inner surface of the cover plate 12 of the case 10. A through hole 41a into which the inner end portion of the positive electrode terminal 31 or of the negative electrode terminal 32 is inserted is provided in the leading end portion of the inner connecting portion 41.

Figure 4C:
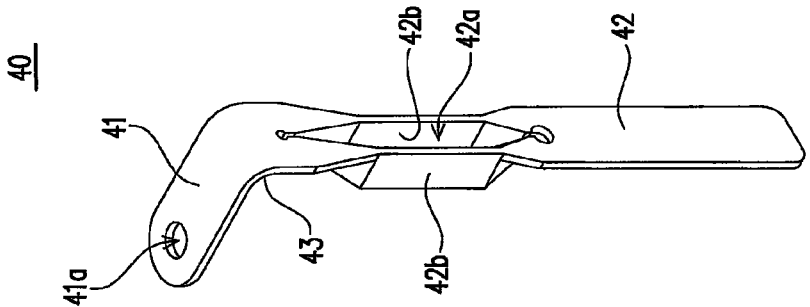
FIG. 4C is a perspective view of the current collector of the cell.
Figure 4B:
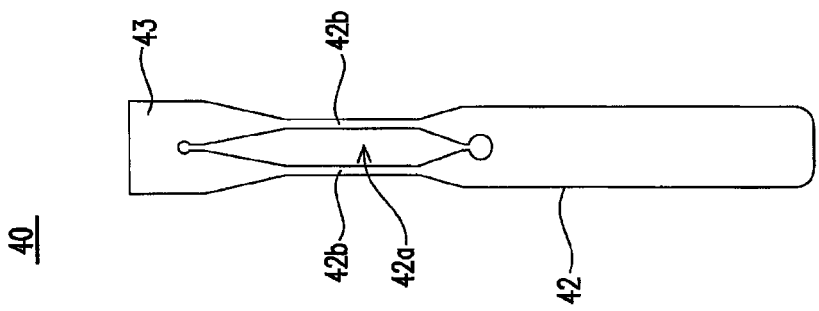
FIG. 4B is a side view of the current collector of the cell.
Figure 4A:
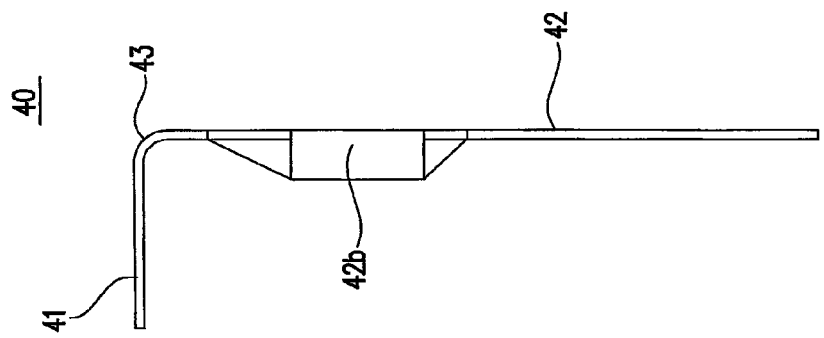
FIG. 4A is a front view of a current collector of the cell.

The electrode attachment portion 42 is disposed between the end portion of the electrode assembly 20 and the end plate portion 11c of the case body 11. As shown in FIGS. 4A to 4C, the electrode attachment portion 42 is provided with an opening 42a. At both edges of the opening 42a, two connection pieces 42b, 42b are provided in a protruding manner in the same direction as the inner connecting portion 41. The opening 42a and the connection pieces 42b, 42b are formed, for example, by making a longitudinal incision in a band plate before the forming of the electrode attachment portion 42 and raising both sides of this incision.

Figure 6:
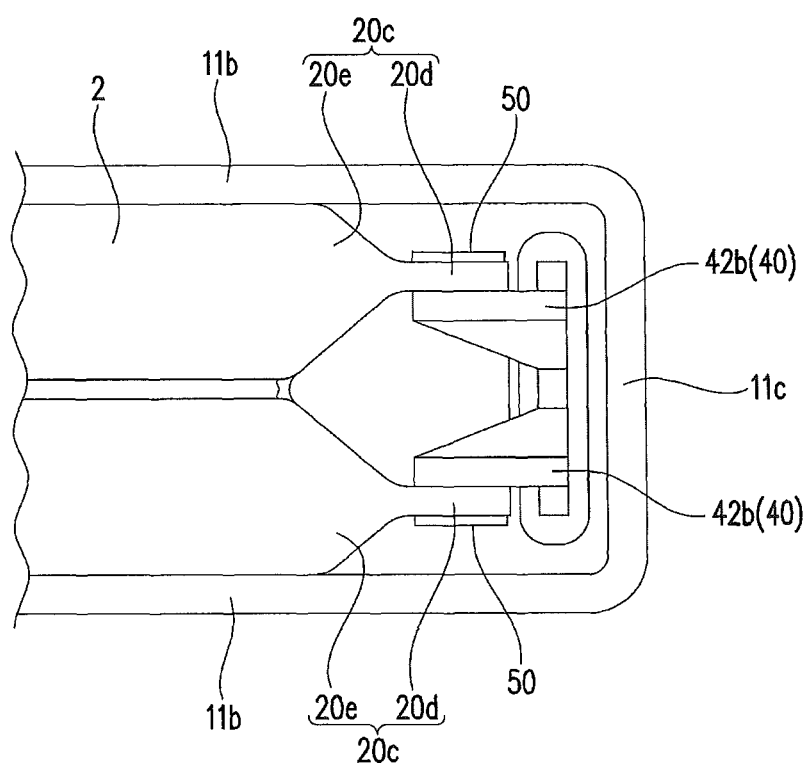
FIG. 6 is a cross sectional view taken along the line A-A of FIG. 1.

As shown in FIG. 6, the protruding portion 20c of the electrode assembly 20 is formed in a pair for both the positive electrode and the negative electrode. That is, the protruding portion 20c of the electrode assembly 20 includes a first protruding portion 20c and a second protruding portion 20c, which are disposed with the winding center of the electrode assembly 20 located therebetween. The first protruding portion 20c and the second protruding portion 20c of the current collector 40 are opposed to each other, with a gap therebetween. Therefore, the pair of connection pieces 42b, 42b of the current collector 40 is inserted into the space between the first protruding portion 20c and the second protruding portion 20c. In this state, one of the connection pieces 42b is attached along the inner surface of the restraining portion 20d of the first protruding portion 20c, and the other connection piece 42b is attached along the inner surface of the restraining portion 20d of the second protruding portion 20c. Furthermore, a first backing member 50 is attached along the outer surface of the restraining portion 20d of the first protruding portion 20c, and a second backing member 50 is attached along the outer surface of the restraining portion 20d of the second protruding portion 20c. In this state, an anvil is set on the connection piece 42b and an ultrasonic oscillator is set to the backing member 50. And the ultrasonic oscillator is caused to perform ultrasonic oscillation, whereby frictional heat is generated and the connection piece 42b and the backing member 50, along with the restraining portion 20d, are ultrasonic welded.

Figure 7:
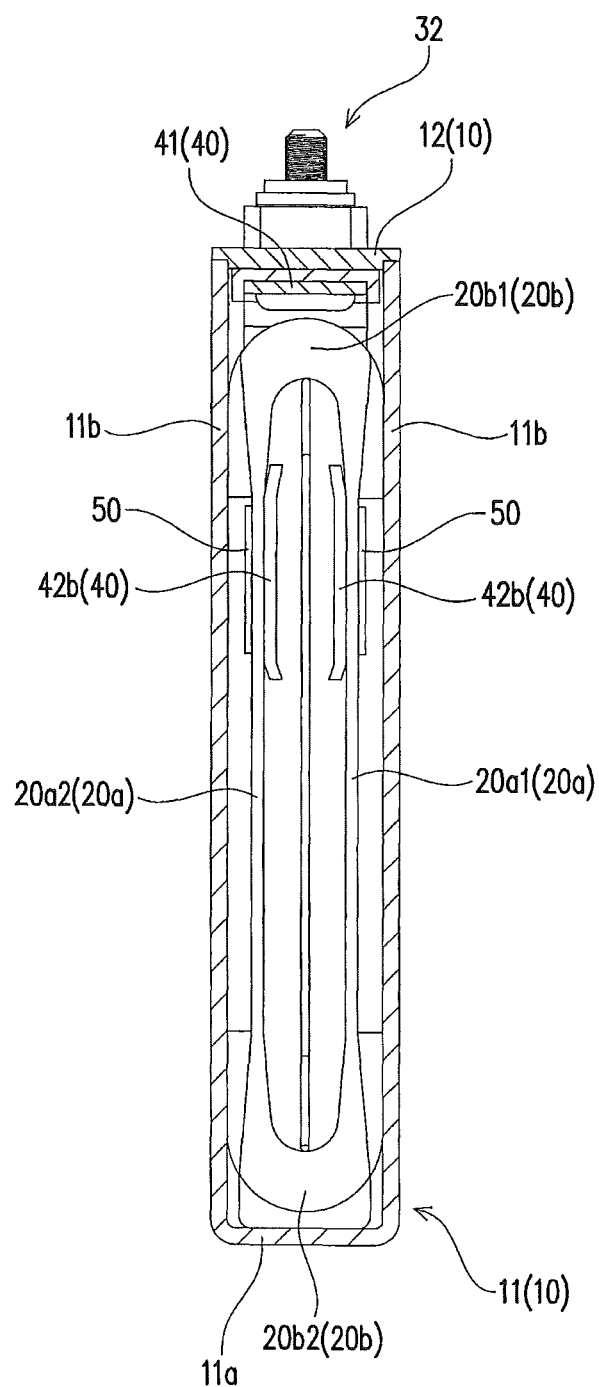
FIG. 7 is a cross sectional view taken along the line B-B of FIG. 1.

As shown in FIG. 7, the pair of connection pieces 42b, 42b of the current collector 40 and first and second backing members 50, 50 are disposed in positions shifted to (located close to) the first curved portions 20b1 (the curved portion 20b on the opening side of the case body 11) in the first and second flat portions 20a1, 20a2. Because the leading-end edge 22d' of the inner-circumferential end portion 22d of the negative electrode 22 on an innermost circumference of the electrode assembly 20 is positioned in the second curved portion 20b2 (the curved portion 20b on the bottom portion 11a side of the case body 11). Whereby each set of the pair of connection pieces 42b, 42b of the current collector 40 and first and second backing members 50, 50 is joined to the restraining portions 20d, 20d of the electrode assembly 20 in areas spaced from the inner-circumferential end portion 22d of the negative electrode 22.

As described above, according to the cell of this embodiment, as shown in FIG. 3, the negative electrode 22 is disposed on an innermost circumference of the electrode assembly 20, covering the inner-circumferential end portion 21d of the positive electrode 21, and the leading-end edge 22d' of the inner-circumferential end portion 22d of the negative electrode 22 is positioned in an area of the second curved portion 20b2 beyond the fold-back point C. Whereby the leading end portion of the inner-circumferential end portion 22d of the negative electrode 22 is curved in the shape of a circular arc along the inner surface of the second curved portion 20b2. For this reason, the leading end portion of the inner-circumferential end portion 22d of the negative electrode 22 generates an elastic force F with which this leading end portion tends to go back straight and spread outwardly, whereby this leading end portion is kept in a condition in which the leading end portion extends along the inner surface of the electrode assembly 20. Therefore, the inner-circumferential end portion 22d of the negative electrode 22 does not move in the space at the winding center. For this reason, such phenomena as described below may not occur: an increase in the interelectrode distance between the positive electrode 21 and the negative electrode 22 and bending of the inner-circumferential end portion 22d of the negative electrode 22, with the result that the function of the electrode in this area is impaired and the capacity of the cell decreases. In the case where the position of the leading-end edge 22d' of the inner-circumferential end portion 22d of the negative electrode 22 is in an area not beyond the fold-back point C of the second curved portion 20b2, the curved length of the leading end portion of the inner-circumferential end portion 22d is not sufficient and the elastic force F with which this leading end portion tends to go back straight is not sufficiently generated. Therefore, this is undesirable.

According to the cell of this embodiment, as shown in FIG. 7, each set of the pair of connection pieces 42b, 42b of the current collector 40 and first and second backing members 50, 50 is joined to the restraining portions 20d, 20d of the electrode assembly 20 in areas spaced from the inner-circumferential end portion 22d of the negative electrode 22. In the case where the sets of the connection pieces 42b and the backing members 50 are disposed in places where the sets of the connection pieces 42b and the backing members 50 sandwich the inner-circumferential end portion 22d of the negative electrode 22, the inner-circumferential end portion 22d of the negative electrode 22 is restrained and therefore the free movement of the inner-circumferential end portion 22d of the negative electrode 22 does not occur. However, in the case of a design in which each set of the pair of connection pieces 42b, 42b of the current collector 40 and first and second backing members 50, 50 is spaced from the inner-circumferential end portion 22d of the negative electrode 22, it is very meaningful to dispose the inner-circumferential end portion 22d of the negative electrode 22 in the above-described position in order to prevent the free movement of the inner-circumferential end portion 22d of the negative electrode 22.

According to the cell of this embodiment, the first and second curved portions 20b1, 20b2 of the electrode assembly 20 have both the shape of a circular arc with a radius of curvature of not less than 0.1 mm. In the case where the radius of curvature is less than 0.1 mm, the space at the winding center of the electrode assembly 20 is very narrow and the free movement of the inner-circumferential end portion 22d of the negative electrode 22 is not apt to occur. However, in the case where the radius of curvature is not less than 0.1 mm and the space at the winding center of the electrode assembly 20 is wide, it is very meaningful to dispose the inner-circumferential end portion 22d of the negative electrode 22 in the above-described position in order to prevent the free movement of the inner-circumferential end portion 22d of the negative electrode 22.

According to the cell of this embodiment, the leading-end edge 21d' of the inner-circumferential end portion 21d of the positive electrode 21 is positioned in the first flat portion 20a1. In general, lithium transition metal composite compounds and the like used as positive-electrode active materials are harder than carbon materials and the like used as negative-electrode active materials. For this reason, in general, the positive-electrode active material layer 21b is harder than the negative-electrode active material layer 22b. Therefore, in the case where the inner-circumferential end portion 21d of the positive electrode 21 is wound with a small radius of curvature, the positive-electrode active material layer 21b may sometimes be broken or exfoliate from the positive-electrode current collector substrate 21a. The leading-end edge 21d' of the inner-circumferential end portion 21d of the positive electrode 21 is disposed in the flat portion 20a, whereby such problems do not arise.

According to the cell of this embodiment, in the first and second protruding portions 20c, 20c disposed with the winding center of the electrode assembly 20 located therebetween, two (a pair of) restraining portions 20d, 20d are provided. The first restraining portion 20d is formed in the first protruding portion 20c. The second restraining portion 20d is formed in the second protruding portion 20c. In the case where two restraining portions 20d are provided, it is possible to make the inclination of the inclined portion 20e gentle compared to the case where one restraining portion 20d is provided. For this reason, it is possible to make the width of the uncoated portion narrow and hence it is possible to increase the cell capacity. However, in the case where two restraining portions 20d are provided, a space is formed at the winding center and therefore the inner-circumferential end portion 22d of the negative electrode 22 becomes apt to move freely. For this reason, it is very meaningful to dispose the inner-circumferential end portion 22d of the negative electrode 22 in the above-described position.

The electric storage device of the present invention is not limited to the configuration of the above-described embodiment. The electric storage device of the present invention is not limited to the operational advantages described above, either. Various changes may be made in the electric storage device of the present invention without departing from the spirit and scope of the present invention.

Figure 8:
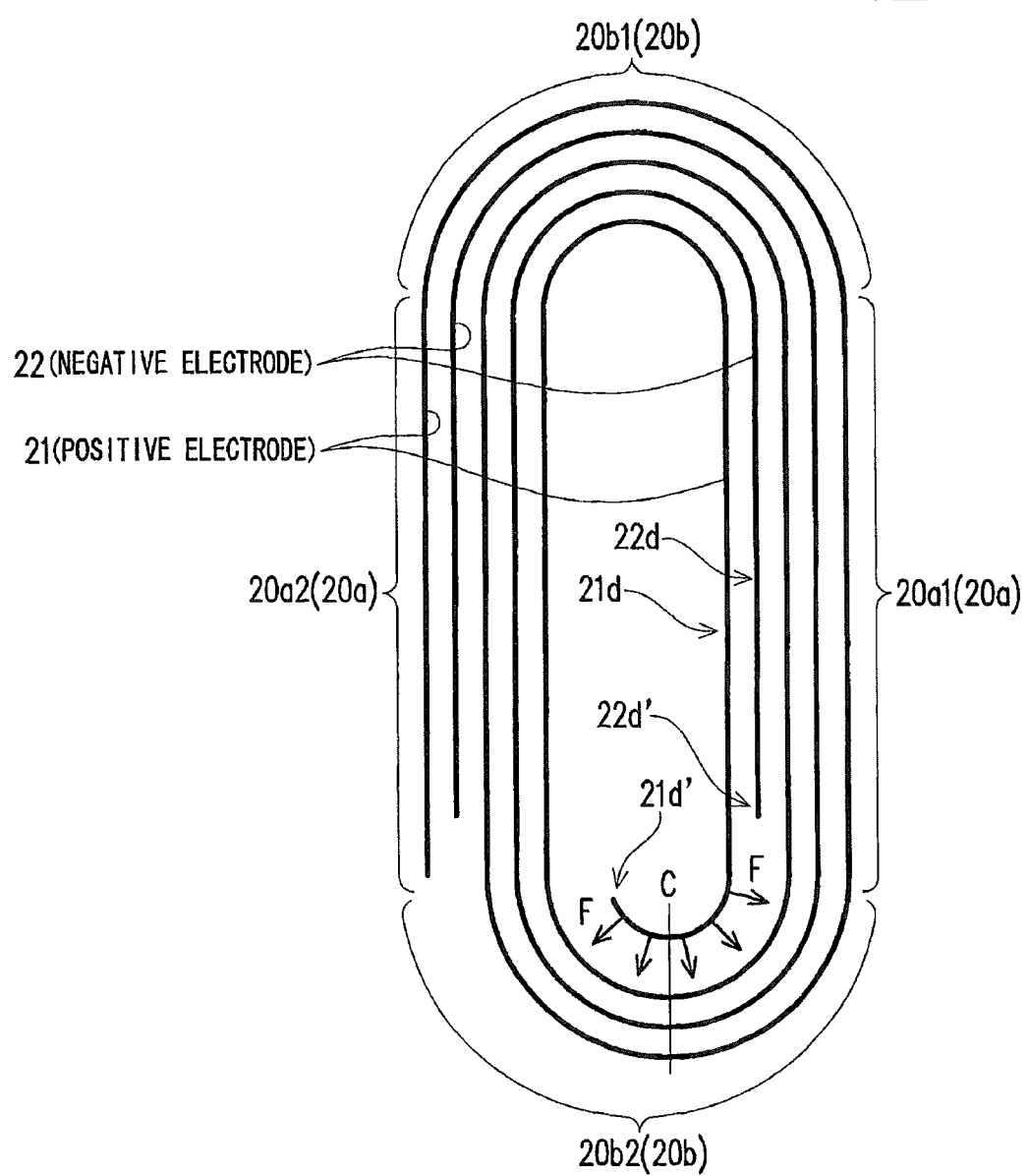
FIG. 8 is a longitudinal sectional conceptual diagram of an electrode assembly of another embodiment.
Figure 9A:
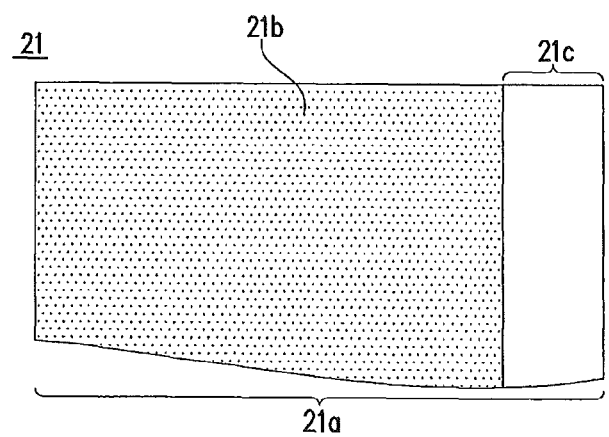
FIG. 9A is an explanatory diagram to explain each element of a positive electrode plate forming a general electrode assembly.
Figure 9B:
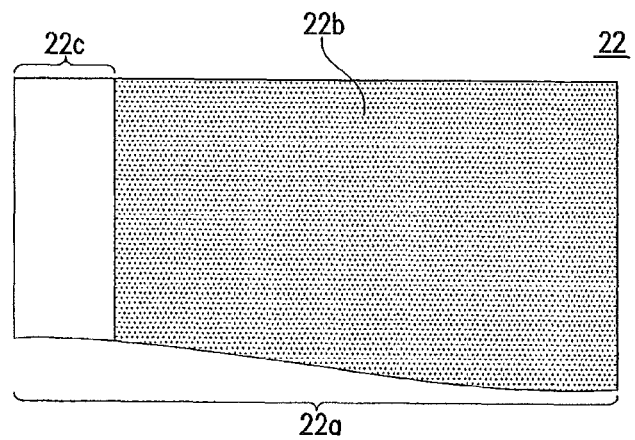
FIG. 9B is an explanatory diagram to explain each element of a negative electrode plate forming the electrode assembly.
Figure 9C:
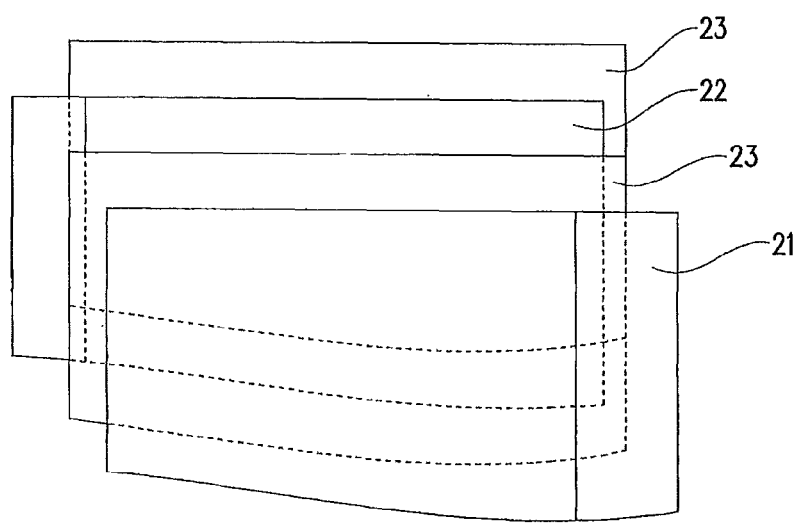
FIG. 9C is an explanatory diagram to explain a positional relationship in a width-direction of a positive electrode plate, a negative electrode plate, and separators.

For example, in the above-described embodiment, it is the negative electrode 22 that is disposed on an innermost circumference of the electrode assembly 20, and the movement (stagger) of the inner-circumferential end portion 22d of the negative electrode 22 is exclusively the object of prevention. However, it is possible to adopt a configuration reverse to this. That is, as shown in FIG. 8, the positive electrode 21 covers the inner-circumferential end portion 22d of the negative electrode 22, is disposed on an innermost circumference of the electrode assembly 20 and the leading-end edge 21d' of the inner-circumferential end portion 21d of the positive electrode 21 may be disposed in an area beyond the fold-back point C in the curved portion 20b. Whereby the leading-end portion of the inner-circumferential end portion 21d of the positive electrode 21 is curved in the shape of a circular arc along the inner surface of the curved portion 20b.

In this case, if in the part of the positive electrode 21 disposed on an innermost circumference of the electrode assembly 20, a positive-electrode active material layer (a positive-electrode active material coated portion) 21b is formed on both surfaces of the positive-electrode current collector substrate 21a, a positive-electrode active material layer (a positive-electrode active material coated portion) 21b formed on the surface of the positive-electrode current collector substrate 21a on the winding center side is exposed in the space at the winding center. In this case, the precipitation of dendrite becomes a problem. Therefore, for the part of the positive electrode 21 disposed on an innermost circumference of the electrode assembly 20, it is preferred that a positive-electrode active material layer (a positive-electrode active material coated portion) 21b be formed only on one surface of the positive-electrode current collector substrate 21a and that a positive-electrode active material layer (a positive-electrode active material coated portion) 21b be not present on the surface of the positive-electrode current collector substrate 21a on the winding center side. Alternatively, by using an active material having a high potential, such as lithium titanate, in the negative electrode, the precipitation of dendrite becomes less apt to occur considerably. In this case, a positive-electrode active material layer (a positive-electrode active material coated portion) 21b may be formed on both surfaces of the positive-electrode current collector substrate 21a also in the part of the positive electrode 21 disposed on an innermost circumference of the electrode assembly 20.

In the above-described embodiment, the leading-end edge of the inner-circumferential end portion of the electrode on an innermost circumference is positioned in the curved portion 20b of the electrode assembly 20 on the bottom portion 11a side of the case body 11. And the current collector 40 (also the backing member 50 is one aspect of the current collector) is connected in the flat portion 20a near the curved portion 20b of the electrode assembly 20 on the opening side of the case body 11, which is the side opposite to the bottom portion 11a side of the case body 11. However, it is possible to adopt a configuration reverse to this. That is, the leading-end edge of the inner-circumferential end portion of the electrode on an innermost circumference may be positioned in the curved portion 20b of the electrode assembly 20 on the opening side of the case body 11, whereby the current collector 40 is connected in the flat portion 20a near the curved portion 20b of the electrode assembly 20 on the bottom portion 11a side of the case body 11, which is the side opposite to the opening side of the case body 11.

The current collector 40 may be connected in any area of the flat portion 20a of the first and second flat portions 20a1, 20a2, as long as this flat portion 20a has the inner-circumferential end portion of the electrode on an innermost circumference not positioned therein. The connection piece 42b of the current collector 40 may also be connected in the area of the flat portion 20a near the curved portion 20b where the leading-end edge of the inner-circumferential end portion of the electrode on an innermost circumference is positioned.

In the above-described embodiment, the connection piece 42b of the current collector 40 is disposed on the inner surface of the restraining portion 20d of the protruding portion 20c of the electrode assembly 20 and the backing member 50 is disposed on the outer surface of this restraining portion 20d. However, it is possible to adopt a configuration reverse to this. That is, the connection piece 42b of the current collector 40 is disposed on the outer surface of the restraining portion 20d of the protruding portion 20c of the electrode assembly 20 and the backing member 50 is disposed on the inner surface of the restraining portion 20d.

In the above-described embodiment, a set of the connection piece 42b of the current collector 40 and backing member 50 is connected to the electrode assembly 20. However, the connecting form of the current collector 40 and the electrode assembly 20 is not limited to this. For example, it is possible to adopt a configuration in which the protruding portion 20c of the electrode assembly 20 is nipped with a clip (not shown) and the current collector 40 is connected to this clip. In this case, the current collector 40 is indirectly connected to the electrode assembly 20.

In the above-described embodiment, the connection piece 42b of the current collector 40 and backing member 50 are ultrasonic joined. However, the joining method is not limited to this. In addition to ultrasonic joining, joining can be performed by various measures such as resistance welding, laser welding and caulking. However, in comprehensive consideration on the heat affect on the positive-electrode active material layer 21b and the negative-electrode active material layer 22b, spatter, electrical resistance in weld zones, workability and the like, it is preferable to perform joining by ultrasonic joining.

The embodiment has been described in the context of a lithium-ion secondary battery cell. However, the type and size (capacity) of a battery cell may be arbitrarily selected.

The present invention is not limited to the lithium-ion secondary battery cell. The present invention can also be applied to various kinds of secondary cells, primary cells, and capacitors such as an electric double layer capacitor.

What is claimed is:
1. An electric storage device, comprising:
a current collector; and
an electrode assembly, in which a positive electrode and a negative electrode in a shape of a sheet are wound with a separator sandwiched therebetween and connected to the current collector,
wherein the electrode assembly has a flat shape and includes a first flat portion and a second flat portion, which are opposed to each other, and a first curved portion and a second curved portion which connect end portions of the first and second flat portions together, wherein one of electrodes of the positive electrode and the negative electrode covers an inner-circumferential end portion of an other electrode of the electrodes of the positive electrode and the negative electrode, and is disposed on an innermost circumference, wherein the one of the electrodes includes a protruding portion and a restraining portion, wherein the protruding portion protrudes from a side end of the other electrode in a direction along a winding center of the electrode assembly, wherein the restraining portion is formed by bundling areas of the protruding portion spaced from an inner-circumferential end portion of the one of the electrodes and is connected to the current collector, wherein the restraining portion includes a first restraining portion on one side of the protruding portion and a second restraining portion on an other side of the protruding portion with the winding center of the electrode assembly therebetween, wherein the first restraining portion restrains the one side of the protruding portion, wherein the second restraining portion restrains the other side of the protruding portion, wherein a leading-end edge of an inner-circumferential end portion of the other electrode is positioned in one of the first and second flat portions, and wherein an inner-circumferential end portion of the one of the electrodes is curved in a shape of a circular arc along an inner surface of one of the first and second curved portions to cause an elastic force to act outwardly on the other electrode.

2. The electric storage device according to claim 1, wherein a leading-end edge of the inner-circumferential end portion of the one of the electrodes is positioned in an area of one of the first and second curved portions beyond a fold-back point of the one of the first and second curved portions.

3. The electric storage device according to claim 1, wherein each of the first and second curved portions has the shape of a circular arc with a radius of curvature of not less than 0.1 mm.

4. The electric storage device according to claim 1, wherein the restraining portion is formed at a position in the first and second flat portions, the position being shifted to an other curved portion on a side opposite to one of the first and second curved portions in which a leading-end edge of the inner-circumferential end portion of the one of the electrodes is positioned.

5. The electric storage device according to claim 1, wherein the one of the electrodes comprises a negative electrode and the other electrode comprises a positive electrode.

6. The electric storage device according to claim 1, wherein the restraining portion is located at a position that is shifted to an other curved portion on a side opposite to one of the first and second curved portions in which a leading-end edge of the inner-circumferential end portion of the one of the electrodes is positioned.

7. The electric storage device according to claim 1, wherein the first restraining portion and the second restraining portion are located closer to the first curved portion than to the second curved portion in which a leading-end edge of the inner-circumferential end portion of the one of the electrodes is positioned.

8. The electric storage device according to claim 1, wherein one of the first restraining portion and the second restraining portion is joined to the restraining portion in an area spaced from an inner-circumferential end portion of the one of the electrodes.

9. The electric storage device according to claim 1, wherein each of the first restraining portion and the second restraining portion is joined to the restraining portion in an area spaced from an inner-circumferential end portion of the one of the electrodes.

10. An electric storage device, comprising:
a current collector; and
an electrode assembly, in which a positive electrode and a negative electrode are wound and connected to the current collector,
wherein the electrode assembly has a flat shape and includes a first flat portion and a second flat portion, which are opposed to each other, and a first curved portion and a second curved portion which connect end portions of the first and second flat portions together,
wherein one of electrodes of the positive electrode and the negative electrode covers an inner-circumferential end portion of an other electrode of the electrodes of the positive electrode and the negative electrode, and is disposed on an innermost circumference,
wherein the one of the electrodes includes a protruding portion and a restraining portion,
wherein the protruding portion protrudes from a side end of the other electrode in a direction along a winding center of the electrode assembly,
wherein the restraining portion includes bundling areas of the protruding portion spaced from an inner-circumferential end portion of the one of the electrodes, and is connected to the current collector,
wherein an inner-circumferential end portion of the one of the electrodes is curved in a shape of a circular arc along an inner surface of one of the first and second curved portions, and
wherein the restraining portion is located closer to the first curved portion than to the second curved portion in which a leading-end edge of the inner-circumferential end portion of the one of the electrodes is positioned.

11. The electric storage device according to claim 10, wherein a leading-end edge of an inner-circumferential end portion of the other electrode is positioned in one of the first and second flat portions.

12. The electric storage device according to claim 10, wherein the restraining portion is located at a position in the first and second flat portions.

13. The electric storage device according to claim 10, wherein the restraining portion comprises a first restraining portion on one side of the protruding portion and a second restraining portion on an other side of the protruding portion with the winding center of the electrode assembly therebetween.

14. The electric storage device according to claim 13, wherein the first restraining portion and the second restraining portion are located closer to the first curved portion than to the second curved portion.

15. The electric storage device according to claim 13, wherein each of the first restraining portion and the second restraining portion is joined to the restraining portion in an area spaced from the inner-circumferential end portion of the one of the electrodes.

16. The electric storage device according to claim 13, wherein at least one of the first restraining portion and the second restraining portion is joined to the restraining portion in an area spaced from the inner-circumferential end portion of the one of the electrodes.

17. The electric storage device according to claim 13, wherein the first restraining portion restrains one side of the protruding portion, and
wherein the second restraining portion restrains an other side of the protruding portion.

* * * * *